United States Patent
Anseth et al.

(10) Patent No.: US 10,466,565 B2
(45) Date of Patent: Nov. 5, 2019

(54) POROUS BACKPLANE FOR ELECTRO-OPTIC DISPLAY

(71) Applicant: E Ink Corporation, Billerica, MA (US)

(72) Inventors: Jay William Anseth, Canton, MA (US); Richard J. Paolini, Jr., Framingham, MA (US)

(73) Assignee: E Ink Corporation, Billerica, MA (US)

(*) Notice: Subject to any disclaimer, the term of this patent is extended or adjusted under 35 U.S.C. 154(b) by 0 days.

(21) Appl. No.: 15/936,579

(22) Filed: Mar. 27, 2018

(65) Prior Publication Data

US 2018/0284556 A1 Oct. 4, 2018

Related U.S. Application Data

(60) Provisional application No. 62/477,505, filed on Mar. 28, 2017.

(51) Int. Cl.
| | | |
|---|---|---|
| G02F 1/167 | (2019.01) | |
| B29D 11/00 | (2006.01) | |
| G09G 3/34 | (2006.01) | |
| G02F 1/13 | (2006.01) | |
| G02F 1/1681 | (2019.01) | |

(52) U.S. Cl.
CPC .......... *G02F 1/167* (2013.01); *B29D 11/0073* (2013.01); *G02F 1/1303* (2013.01); *G02F 1/1681* (2019.01); *G09G 3/344* (2013.01); *G09G 2300/0426* (2013.01)

(58) Field of Classification Search
CPC ...... G02F 1/167; G02F 1/1681; G02F 1/1303; B29D 11/0073; G09G 3/344; G09G 2300/0426

USPC ........................................................ 359/296
See application file for complete search history.

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 6,054,071 A | 4/2000 | Mikkelsen, Jr. |
| 6,055,091 A | 4/2000 | Sheridon |
| 6,097,531 A | 8/2000 | Sheridon |
| 6,124,851 A | 9/2000 | Jacobson |

(Continued)

FOREIGN PATENT DOCUMENTS

| | | |
|---|---|---|
| KR | 20090061471 A | 6/2009 |
| KR | 20120071542 A | 7/2012 |

(Continued)

OTHER PUBLICATIONS

Korean Intellectual Property Office, PCT/US2018/024438, International Search Report and Written Opinion, dated Jul. 17, 2018. Jul. 17, 2018.

(Continued)

*Primary Examiner* — Wen Huang
(74) *Attorney, Agent, or Firm* — Ioannis Constantinides

(57) ABSTRACT

A backplane for an electro-optic display including an electrode and a substrate. The substrate may be porous to liquids, e.g., water, and may formed, from cellulose or a similar hydrophilic polymer. The electrode is desirably also porous to the same liquid as the substrate, so that the electrodes do not form liquid-impervious areas on the substrate. For example, when the liquid is water (or an aqueous solution) the electrodes may be formed of a hydrophilic carbon black, which may be coated or screen-printed on to the substrate.

8 Claims, 3 Drawing Sheets

(56) References Cited

U.S. PATENT DOCUMENTS

| | | |
|---|---|---|
| 6,128,124 A | 10/2000 | Silverman |
| 6,130,773 A | 10/2000 | Jacobson |
| 6,137,467 A | 10/2000 | Sheridon |
| 6,147,791 A | 11/2000 | Sheridon |
| 6,177,921 B1 | 1/2001 | Comiskey |
| 6,232,950 B1 | 5/2001 | Albert |
| 6,241,921 B1 | 6/2001 | Jacobson |
| 6,252,564 B1 | 6/2001 | Albert |
| 6,312,304 B1 | 11/2001 | Duthaler |
| 6,312,971 B1 | 11/2001 | Amundson |
| 6,376,828 B1 | 4/2002 | Comiskey |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,480,182 B2 | 11/2002 | Turner |
| 6,498,114 B1 | 12/2002 | Amundson |
| 6,506,438 B2 | 1/2003 | Duthaler |
| 6,518,949 B2 | 2/2003 | Drzaic |
| 6,521,489 B2 | 2/2003 | Duthaler et al. |
| 6,535,197 B1 | 3/2003 | Comiskey |
| 6,545,291 B1 | 4/2003 | Amundson |
| 6,639,578 B1 | 10/2003 | Comiskey |
| 6,657,772 B2 | 12/2003 | Loxley |
| 6,664,944 B1 | 12/2003 | Albert |
| D485,294 S | 1/2004 | Albert |
| 6,680,725 B1 | 1/2004 | Jacobson |
| 6,683,333 B2 | 1/2004 | Kazlas |
| 6,724,519 B1 | 4/2004 | Comiskey |
| 6,750,473 B2 | 6/2004 | Amundson |
| 6,816,147 B2 | 11/2004 | Albert |
| 6,819,471 B2 | 11/2004 | Amundson |
| 6,825,068 B2 | 11/2004 | Denis |
| 6,825,829 B1 | 11/2004 | Albert |
| 6,831,769 B2 | 12/2004 | Holman |
| 6,839,158 B2 | 1/2005 | Albert |
| 6,842,167 B2 | 1/2005 | Albert |
| 6,842,279 B2 | 1/2005 | Amundson |
| 6,842,657 B1 | 1/2005 | Drzaic |
| 6,865,010 B2 | 3/2005 | Duthaler et al. |
| 6,866,760 B2 | 3/2005 | Paolini, Jr. |
| 6,873,452 B2 | 3/2005 | Tseng |
| 6,909,532 B2 | 6/2005 | Chung |
| 6,922,276 B2 | 7/2005 | Zhang |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen |
| 7,012,600 B2 | 3/2006 | Zehner |
| 7,012,735 B2 | 3/2006 | Honeyman |
| 7,030,412 B1 | 4/2006 | Drzaic et al. |
| 7,072,095 B2 | 7/2006 | Liang |
| 7,075,502 B1 | 7/2006 | Drzaic |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,110,163 B2 | 9/2006 | Webber et al. |
| 7,110,164 B2 | 9/2006 | Paolini, Jr. et al. |
| 7,112,114 B2 | 9/2006 | Liang |
| 7,116,318 B2 | 10/2006 | Amundson |
| 7,144,942 B2 | 12/2006 | Zang |
| 7,148,128 B2 | 12/2006 | Jacobson |
| 7,158,282 B2 | 1/2007 | Liang |
| 7,167,155 B1 | 1/2007 | Albert |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,236,292 B2 | 6/2007 | LeCain |
| 7,256,766 B2 | 8/2007 | Albert et al. |
| 7,259,744 B2 | 8/2007 | Arango |
| 7,280,094 B2 | 10/2007 | Albert |
| 7,301,693 B2 | 11/2007 | Chaug |
| 7,304,780 B2 | 12/2007 | Liu |
| 7,312,784 B2 | 12/2007 | Baucom |
| 7,327,346 B2 | 2/2008 | Chung |
| 7,327,511 B2 | 2/2008 | Whitesides |
| 7,347,957 B2 | 3/2008 | Wu |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Duthaler |
| 7,382,363 B2 | 6/2008 | Albert et al. |
| 7,388,572 B2 | 6/2008 | Duthaler et al. |
| 7,401,758 B2 | 7/2008 | Liang |
| 7,411,719 B2 | 8/2008 | Paolini, Jr. |
| 7,420,549 B2 | 9/2008 | Jacobson |
| 7,442,587 B2 | 10/2008 | Amundson et al. |
| 7,443,571 B2 | 10/2008 | LeCain et al. |
| 7,453,445 B2 | 11/2008 | Amundson |
| 7,492,497 B2 | 2/2009 | Paolini, Jr. |
| 7,513,813 B2 | 4/2009 | Paolini, Jr. et al. |
| 7,535,624 B2 | 5/2009 | Amundson et al. |
| 7,551,346 B2 | 6/2009 | Fazel |
| 7,554,712 B2 | 6/2009 | Patry et al. |
| 7,560,004 B2 | 7/2009 | Pereira |
| 7,561,324 B2 | 7/2009 | Duthaler et al. |
| 7,583,427 B2 | 9/2009 | Danner |
| 7,585,703 B2 | 9/2009 | Matsumura et al. |
| 7,598,173 B2 | 10/2009 | Ritenour |
| 7,605,799 B2 | 10/2009 | Amundson et al. |
| 7,615,325 B2 | 11/2009 | Liang |
| 7,636,191 B2 | 12/2009 | Duthaler |
| 7,649,666 B2 | 1/2010 | Isobe et al. |
| 7,649,674 B2 | 1/2010 | Danner |
| 7,667,886 B2 | 2/2010 | Danner |
| 7,672,040 B2 | 3/2010 | Sohn |
| 7,679,814 B2 | 3/2010 | Paolini, Jr. |
| 7,688,497 B2 | 3/2010 | Danner |
| 7,715,088 B2 | 5/2010 | Liang |
| 7,728,811 B2 | 6/2010 | Albert et al. |
| 7,729,039 B2 | 6/2010 | LeCain et al. |
| 7,733,335 B2 | 6/2010 | Zehner |
| 7,785,988 B2 | 8/2010 | Amundson |
| 7,791,782 B2 | 9/2010 | Paolini, Jr. |
| 7,826,129 B2 | 11/2010 | Wu |
| 7,830,592 B1 | 11/2010 | Sprague |
| 7,839,564 B2 | 11/2010 | Whitesides et al. |
| 7,843,621 B2 | 11/2010 | Danner et al. |
| 7,843,624 B2 | 11/2010 | Danner |
| 7,843,626 B2 | 11/2010 | Amundson et al. |
| 7,859,637 B2 | 12/2010 | Amundson et al. |
| 7,880,958 B2 | 2/2011 | Zang |
| 7,893,435 B2 | 2/2011 | Kazlas et al. |
| 7,898,717 B2 | 3/2011 | Patry |
| 7,905,977 B2 | 3/2011 | Qi |
| 7,957,053 B2 | 6/2011 | Honeyman |
| 7,986,450 B2 | 7/2011 | Cao |
| 8,009,344 B2 | 8/2011 | Danner |
| 8,009,348 B2 | 8/2011 | Zehner |
| 8,027,081 B2 | 9/2011 | Danner |
| 8,034,209 B2 | 10/2011 | Danner |
| 8,049,947 B2 | 11/2011 | Danner |
| 8,068,272 B2 | 11/2011 | LeCain et al. |
| 8,072,675 B2 | 12/2011 | Lin |
| 8,077,141 B2 | 12/2011 | Duthaler |
| 8,077,381 B2 | 12/2011 | LeCain et al. |
| 8,089,453 B2 | 1/2012 | Comiskey |
| 8,120,836 B2 | 2/2012 | Lin |
| 8,159,636 B2 | 4/2012 | Sun |
| 8,177,942 B2 | 5/2012 | Paolini, Jr. |
| 8,208,193 B2 | 6/2012 | Patry |
| 8,237,892 B1 | 8/2012 | Sprague |
| 8,238,021 B2 | 8/2012 | Sprague |
| 8,362,488 B2 | 1/2013 | Chaug |
| 8,373,211 B2 | 2/2013 | Amundson |
| 8,389,381 B2 | 3/2013 | Amundson |
| 8,390,301 B2 | 3/2013 | Danner |
| 8,395,836 B2 | 3/2013 | Lin |
| 8,437,069 B2 | 5/2013 | Lin |
| 8,441,414 B2 | 5/2013 | Lin |
| 8,456,589 B1 | 6/2013 | Sprague |

(56) References Cited

U.S. PATENT DOCUMENTS

| | | |
|---|---|---|
| 8,482,835 B2 | 7/2013 | LeCain |
| 8,498,042 B2 | 7/2013 | Danner |
| 8,514,168 B2 | 8/2013 | Chung |
| 8,542,430 B2 | 9/2013 | Yasui |
| 8,547,628 B2 | 10/2013 | Wu |
| 8,576,162 B2 | 11/2013 | Kang |
| 8,576,476 B2 | 11/2013 | Telfer, Jr. |
| 8,610,988 B2 | 12/2013 | Zehner et al. |
| 8,714,780 B2 | 5/2014 | Ho |
| 8,728,266 B2 | 5/2014 | Danner |
| 8,743,077 B1 | 6/2014 | Sprague |
| 8,754,859 B2 | 6/2014 | Gates |
| 8,786,929 B2 | 7/2014 | LeCain |
| 8,797,258 B2 | 8/2014 | Sprague |
| 8,797,633 B1 | 8/2014 | Sprague |
| 8,797,636 B2 | 8/2014 | Yang |
| 8,830,553 B2 | 9/2014 | Patry, Jr. |
| 8,830,560 B2 | 9/2014 | Danner |
| 8,854,721 B2 | 10/2014 | Danner |
| 8,891,155 B2 | 11/2014 | Danner |
| 8,969,886 B2 | 3/2015 | Amundson |
| 9,025,234 B2 | 5/2015 | Lin |
| 9,025,238 B2 | 5/2015 | Chan |
| 9,030,374 B2 | 5/2015 | Sprague |
| 9,075,280 B2 | 7/2015 | Whitesides |
| 9,140,952 B2 | 9/2015 | Sprague |
| 9,147,364 B2 | 9/2015 | Wu |
| 9,152,003 B2 | 10/2015 | Danner |
| 9,152,004 B2 | 10/2015 | Paolini, Jr. |
| 9,201,279 B2 | 12/2015 | Wu |
| 9,223,164 B2 | 12/2015 | Lai |
| 9,238,340 B2 | 1/2016 | Kayal |
| 9,279,906 B2 | 3/2016 | Kang |
| 9,285,648 B2 | 3/2016 | Liu |
| 9,310,661 B2 | 4/2016 | Wu |
| 9,346,987 B2 | 5/2016 | Wang |
| 9,419,024 B2 | 8/2016 | Ritenour |
| 9,454,057 B2 | 9/2016 | Wu |
| 9,470,950 B2 | 10/2016 | Paolini, Jr. et al. |
| 9,529,240 B2 | 12/2016 | Paolini, Jr. |
| 9,554,495 B2 | 1/2017 | Danner |
| 9,620,066 B2 | 4/2017 | Bishop |
| 9,671,635 B2 | 6/2017 | Paolini, Jr. |
| 9,733,540 B2 | 8/2017 | LeCain et al. |
| 2002/0060321 A1 | 5/2002 | Kazlas |
| 2004/0085619 A1 | 5/2004 | Wu |
| 2004/0105036 A1 | 6/2004 | Danner et al. |
| 2005/0122306 A1 | 6/2005 | Wilcox et al. |
| 2005/0122563 A1 | 6/2005 | Honeyman et al. |
| 2006/0255322 A1 | 11/2006 | Wu |
| 2007/0052757 A1 | 3/2007 | Jacobson |
| 2007/0237962 A1 | 10/2007 | Liang |
| 2009/0122389 A1 | 5/2009 | Whitesides |
| 2009/0168067 A1 | 7/2009 | LeCain et al. |
| 2009/0315044 A1 | 12/2009 | Amundson |
| 2010/0177396 A1 | 7/2010 | Lin |
| 2011/0140744 A1 | 6/2011 | Kazlas |
| 2011/0164301 A1 | 7/2011 | Paolini, Jr. |
| 2011/0187683 A1 | 8/2011 | Wilcox |
| 2011/0292319 A1 | 12/2011 | Cole |
| 2013/0278900 A1 | 10/2013 | Hertel et al. |
| 2014/0078024 A1 | 3/2014 | Paolini, Jr. |
| 2014/0139501 A1 | 5/2014 | Amundson |
| 2014/0192000 A1 | 7/2014 | Hung |
| 2014/0210701 A1 | 7/2014 | Wu |
| 2014/0300837 A1 | 10/2014 | Gates |
| 2014/0368753 A1 | 12/2014 | Cheng |
| 2014/0376164 A1 | 12/2014 | Huang |
| 2015/0005720 A1 | 1/2015 | Zang |
| 2015/0226986 A1 | 8/2015 | Paolini, Jr. |
| 2015/0227018 A1 | 8/2015 | Paolini, Jr. |
| 2015/0261057 A1 | 9/2015 | Harris |
| 2015/0277160 A1 | 10/2015 | Laxton |
| 2015/0293425 A1 | 10/2015 | Kaino et al. |
| 2015/0356927 A1 | 12/2015 | Hung |
| 2015/0378235 A1 | 12/2015 | Lin |
| 2016/0012710 A1 | 1/2016 | Lu |
| 2016/0077375 A1 | 3/2016 | Lin |
| 2016/0103380 A1 | 4/2016 | Kayal |
| 2016/0187759 A1 | 6/2016 | Wu |

FOREIGN PATENT DOCUMENTS

| | | |
|---|---|---|
| KR | 101361163 B1 | 2/2014 |
| WO | 1999067678 A2 | 12/1999 |
| WO | 2000005704 A1 | 2/2000 |
| WO | 2000038000 A1 | 6/2000 |

OTHER PUBLICATIONS

Hayes, R.A. et al., "Video-Speed Electronic Paper Based on Electrowetting", Nature, vol. 425, No. 25, pp. 383-385 (Sep. 2003). Sep. 25, 2003.

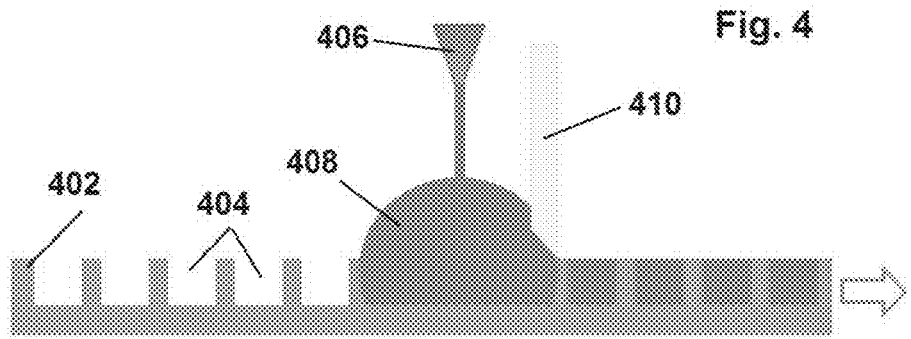
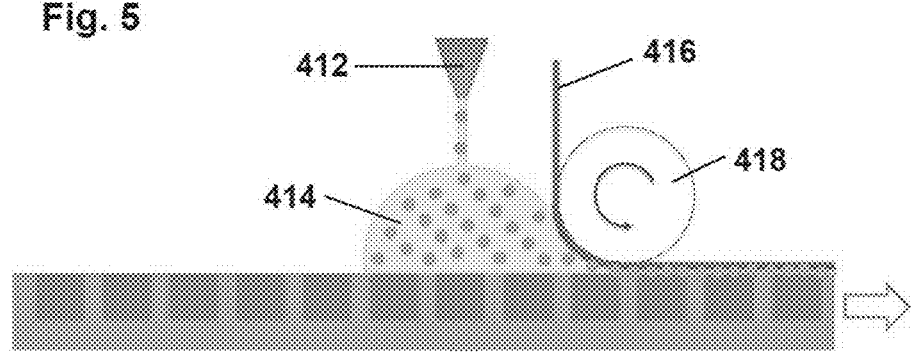

//POROUS BACKPLANE FOR ELECTRO-OPTIC DISPLAY

RELATED APPLICATIONS

This application claims priority to U.S. Provisional Application No. 62/477,505, filed Mar. 28, 2017, which is incorporated herein by reference in its entirety.

BACKGROUND OF INVENTION

This invention relates to a backplane for an electro-optic display, especially an electrophoretic display.

SUMMARY OF INVENTION

This invention provides a backplane for an electro-optic display, the backplane comprising at least one electrode disposed on a substrate, wherein the substrate, or the electrode, or both are porous to liquid. The backplane may be porous to e.g., water, and the substrate may be formed, for example, from cellulose or a similar hydrophilic polymer.

In the backplane of the present invention, the electrode(s) are desirably of a type which are also porous to the same liquid as the substrate, so that the electrodes do not form liquid-impervious areas on the substrate. For example, when the liquid is water (or an aqueous solution) the electrodes may be formed of a hydrophilic carbon black, which may be coated or screen printed on to the substrate.

This invention also provides an electro-optic display comprising a layer of electro-optic material comprising a continuous phase comprising a liquid, and a backplane comprising at least one (backplane) electrode in contact with the layer of electro-optic material and a substrate porous to said liquid. The electro-optic material may be an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material.

The electro-optic display of the present invention may further comprise at least one (front) electrode in contact with the opposed side of the layer of electro-optic material from the backplane electrode, and may also comprise a front substrate arranged to support the front electrode. Alternatively, the display may comprise a front substrate without a front electrode. At least one of the backplane and front electrodes (typically the latter) should be light-transmissive (a term which is used herein to mean that the layer transmits sufficient light to enable an observer, looking through that layer, to observe the change in display states of the electro-optic medium), and if the front electrode is light-transmissive any front substrate present should also be light-transmissive.

This invention also provides a first process for forming an electro-optic display, the process comprising:
 providing a front substrate;
 forming on the front substrate a layer of an electro-optic material comprising a liquid;
 contacting the exposed surface of the layer of with a backplane comprising at least one electrode disposed on a substrate which is porous to the liquid; and
 thereafter subjecting combined assembly comprising the front substrate, layer of electro-optic material and backplane to conditions effective to cause the liquid to diffuse through the porous substrate and be removed from the combined assembly, thereby causing the layer of electro-optic material to form a coherent layer which secures the front substrate and backplane to each other.

This invention also provides a second process for forming an electro-optic display, the process comprising:
 providing a front substrate having a plurality of cavities therein;
 disposing an electro-optic material within the cavities;
 forming a layer of a sealing material over the electro-optic material within the cavities, the sealing material comprising a liquid;
 contacting the exposed surface of the sealing material with a backplane comprising at least one electrode disposed on a substrate which is porous to the liquid; and
 thereafter subjecting combined assembly comprising the front substrate, electro-optic material, sealing material and backplane to conditions effective to cause the liquid to diffuse through the porous substrate and be removed from the combined assembly, thereby causing the layer of sealing material to form a coherent layer which secures the front substrate and backplane to each other.

The first and second processes of the present invention may include the addition step, following the removal of the liquid, of dicing the backplane substrate and electrode to form a plurality of discrete electrodes.

BRIEF DESCRIPTION OF DRAWINGS

FIG. 4 is a schematic cross-section, similar to those of FIGS. 1 and 2, but showing a first step of a second process of the invention in which an electro-optic material is filled into cavities in a substrate and a sealing material applied.

FIG. 5 is a schematic cross-section, similar to that of FIG. 3, but showing a second step of the second process of the invention in which a backplane is contacted with the exposed surface of the sealing material.

DETAILED DESCRIPTION

Figure 1:
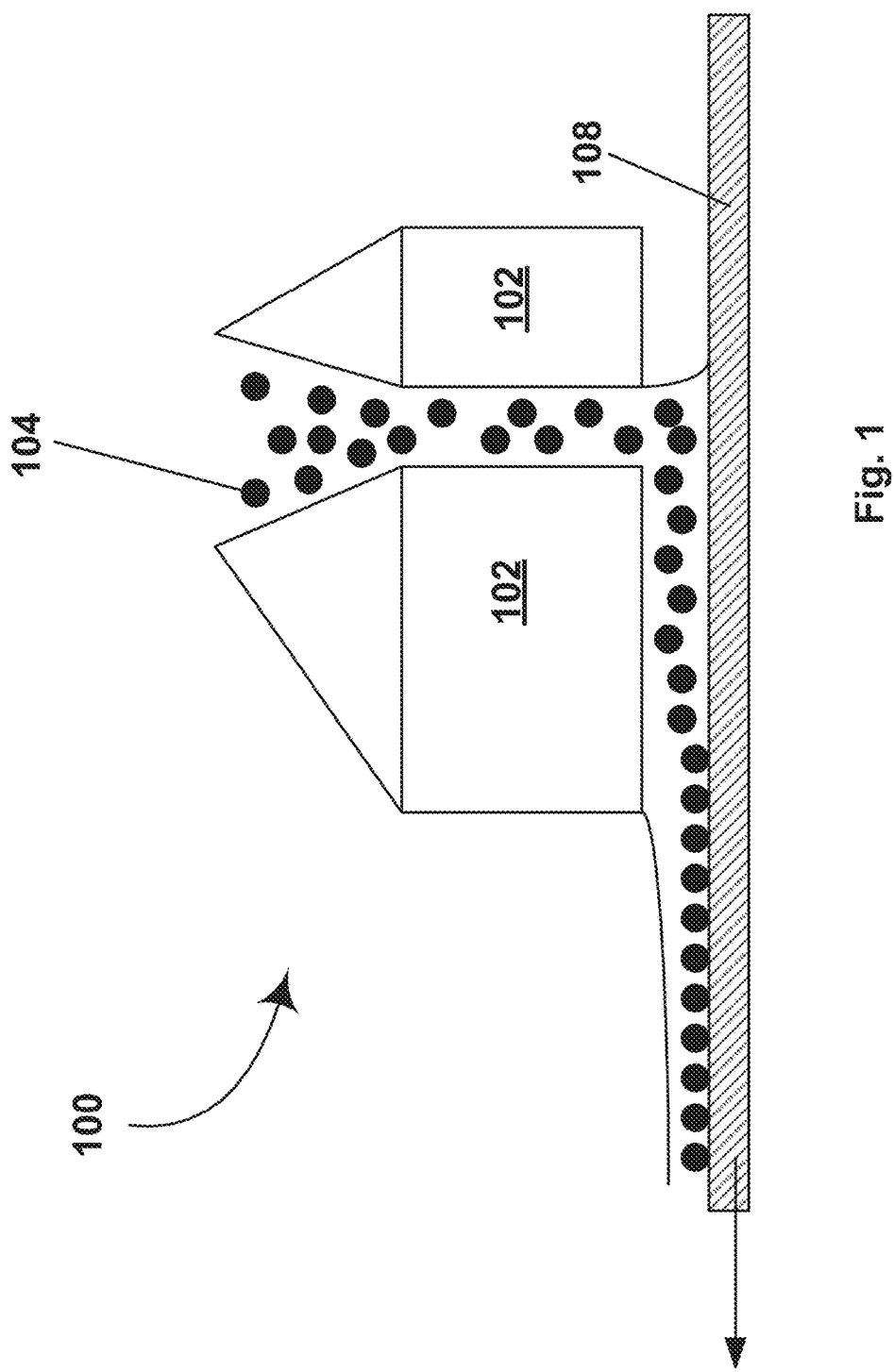
FIG. 1 of the accompanying drawings is a schematic cross-section through a first step in a first process of the present invention and shows a layer of an electro-optic material being formed on a front substrate.

As indicated above, the present invention provides a backplane for an electro-optic display, the backplane comprising at least one electrode disposed on a substrate which is porous to liquid, an electro-optic display comprising such a backplane, and processes for the production of such a display.

The present invention is designed to solve or alleviate certain problems long encountered in the production of solid electro-optic displays, a term which is used herein to mean displays in which the electro-optic material is solid in the sense that it has solid external surfaces, although the material may, and often does, have internal liquid- or gas-filled spaces. Thus, the term "solid electro-optic displays"

includes rotating bichromal member displays, encapsulated electrophoretic displays, microcell electrophoretic displays and encapsulated liquid crystal displays.

There is an extensive literature on such solid electro-optic displays and processes for their production. For example, rotating bichromal member type displays are described in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface.

Electro-wetting displays are described in Hayes, R. A., et al., "Video-Speed Electronic Paper Based on Electrowetting", Nature, 425, 383-385 (2003) and U.S. Pat. No. 7,420, 549.

Encapsulated and microcell electrophoretic and other electro-optic media are described in numerous patents and applications assigned to or in the names of the Massachusetts Institute of Technology (MIT), E Ink Corporation, E Ink California, LLC and related companies. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. Typically, one of the electrodes is light transmissive light-transmissive, i.e., the electrode transmits sufficient light to enable an observer, looking through the electrode, to observe the change in a display states of an electro-optic medium. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,825,829; 6,982,178; 7,112,114; 7,158,282; 7,236,292; 7,443, 571; 7,513,813; 7,561,324; 7,636,191; 7,649,666; 7,728,811; 7,729,039; 7,791,782; 7,839,564; 7,843, 621; 7,843,624; 8,034,209; 8,068,272; 8,077,381; 8,177,942; 8,390,301; 8,482,835; 8,786,929; 8,830, 553; 8,854,721; 9,075,280; and 9,238,340; and U.S. Patent Applications Publication Nos. 2007/0237962; 2009/0109519; 2009/0168067; 2011/0164301; 2014/ 0115884; and 2014/0340738;
(f) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376, 828; 6,392,786; 6,413,790; 6,422,687; 6,445,374; 6,480,182; 6,498,114; 6,506,438; 6,518,949; 6,521, 489; 6,535,197; 6,545,291; 6,639,578; 6,657,772; 6,664,944; 6,680,725; 6,683,333; 6,724,519; 6,750, 473; 6,816,147; 6,819,471; 6,825,068; 6,831,769; 6,842,167; 6,842,279; 6,842,657; 6,865,010; 6,873, 452; 6,909,532; 6,967,640; 6,980,196; 7,012,735; 7,030,412; 7,075,703; 7,106,296; 7,110,163; 7,116, 318; 7,148,128; 7,167,155; 7,173,752; 7,176,880; 7,190,008; 7,206,119; 7,223,672; 7,230,751; 7,256, 766; 7,259,744; 7,280,094; 7,301,693; 7,304,780; 7,327,511; 7,347,957; 7,349,148; 7,352,353; 7,365, 394; 7,365,733; 7,382,363; 7,388,572; 7,401,758; 7,442,587; 7,492,497; 7,535,624; 7,551,346; 7,554, 712; 7,583,427; 7,598,173; 7,605,799; 7,636,191; 7,649,674; 7,667,886; 7,672,040; 7,688,497; 7,733, 335; 7,785,988; 7,830,592; 7,843,626; 7,859,637; 7,880,958; 7,893,435; 7,898,717; 7,905,977; 7,957, 053; 7,986,450; 8,009,344; 8,027,081; 8,049,947; 8,072,675; 8,077,141; 8,089,453; 8,120,836; 8,159, 636; 8,208,193; 8,237,892; 8,238,021; 8,362,488; 8,373,211; 8,389,381; 8,395,836; 8,437,069; 8,441, 414; 8,456,589; 8,498,042; 8,514,168; 8,547,628; 8,576,162; 8,610,988; 8,714,780; 8,728,266; 8,743, 077; 8,754,859; 8,797,258; 8,797,633; 8,797,636; 8,830,560; 8,891,155; 8,969,886; 9,147,364; 9,025, 234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/ 0122563; 2006/0215106; 2006/0255322; 2007/ 0052757; 2007/0097489; 2007/0109219; 2008/ 0061300; 2008/0149271; 2009/0122389; 2009/ 0315044; 2010/0177396; 2011/0140744; 2011/ 0187683; 2011/0187689; 2011/0292319; 2013/ 0250397; 2013/0278900; 2014/0078024; 2014/ 0139501; 2014/0192000; 2014/0210701; 2014/ 0300837; 2014/0368753; 2014/0376164; 2015/ 0171112; 2015/0205178; 2015/0226986; 2015/ 0227018; 2015/0228666; 2015/0261057; 2015/ 0356927; 2015/0378235; 2016/077375; 2016/ 0103380; and 2016/0187759; and International Application Publication No. WO 00/38000; European Patents Nos. 1,099,207 B1 and 1,145,072 B1;
(g) Color formation and color adjustment; see for example U.S. Pat. Nos. 7,075,502 and 7,839,564;
(h) Methods for driving displays; see for example U.S. Pat. Nos. 7,012,600 and 7,453,445;
(i) Applications of displays; see for example U.S. Pat. Nos. 7,312,784 and 8,009,348; and
(j) Non-electrophoretic displays, as described in U.S. Pat. No. 6,241,921 and U.S. Patent Application Publication No. 2015/0277160; and applications of encapsulation and microcell technology other than displays; see for example U.S. Pat. No. 7,615,325; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

Several different approaches are used to produce such three-layer structures. For example, in U.S. Pat. Nos. 6,839,158 and 6,982,178 and several other of the aforementioned patents and applications, there is described a process in which an encapsulated electrophoretic medium comprising capsules in a flowable binder is coated on to a flexible substrate comprising indium-tin-oxide (ITO) or a similar conductive coating (which acts as one electrode of the final display) on a plastic film, the capsules/binder coating being dried to remove a liquid (typically water) from the binder and form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

U.S. Pat. Nos. 6,866,760 and 7,079,305 describe a similar process for forming a polymer-dispersed electrophoretic display. In this case, the initial coating is formed using an emulsion of an internal phase (electrophoretic particles plus dispersion medium) in an aqueous binder. The binder dries as previously described, both permanently encapsulating the internal phase and forming a coherent layer.

A variant of this process is described in U.S. Pat. No. 7,561,324, which describes a so-called "double release sheet", essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are used in processes generally similar to those using a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired. (When the form of the double release sheet without adhesive layers is used, the necessary adhesive layer must be provided on the surface of front sub-assembly or backplane facing the electro-optic medium.)

A further variant of the process is described in U.S. Pat. No. 7,839,564; this variant uses a so-called "inverted front plane laminate", a variant of the front plane laminate described above. This inverted front plane laminate comprises, in order, at least one of a light-transmissive protective layer and a light-transmissive electrically-conductive layer, an adhesive layer, a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Microcell displays are manufactured in a somewhat different manner. A substrate is first prepared, typically by embossing on a semi-solid polymeric layer, containing an array of open cavities or recesses. The cavities are filled with an electro-optic medium, typically by flowing the medium across the substrate and removing excess medium with a doctor blade. A sealing layer is formed over the open mouths of the cavities and dried or otherwise hardened to form a coherent sealing layer. Finally, an adhesive layer (typically supported on a release sheet) is laminated over the sealing layer. In a later step of the process, the release sheet (if present) is removed and the adhesive layer laminated to a backplane.

All these processes suffer from two problems. The first problem is that each involves at least two, and in some cases three, lamination steps; at a minimum, there is one lamination step to attach an adhesive layer to an electro-optic layer and a second step to laminate the adhesive layer to a backplane. These lamination steps are slow, typically being conducted at 0.5 ft/min (about 2.5 mm/sec) and at an elevated temperature of 200-250° F. (94-121° C.). These lamination conditions may affect the moisture content in the laminated film in a somewhat unpredictable manner depending upon the lamination conditions used and the ambient temperature and humidity, and the electro-optic properties of electrophoretic and other electro-optic displays are highly sensitive to the moisture content of the display. The second problem is that each process leaves at least one, and in some cases two, lamination adhesive layers between the electrodes in the final display. This lamination adhesive layer has a substantial electrical resistance, which is in series with that of the electro-optic layer itself, so that a substantial fraction of the available voltage drop between the electrodes is "wasted" across the lamination adhesive and is not available to drive the electro-optic layer. The electrical resistance of the lamination adhesive can be varied (see for example U.S. Pat. No. 7,012,735, which describes adding ionic dopants to the lamination adhesive to reduce its resistance) but such doping involves its own problems, such as unwanted migration of mobile species outside the lamination adhesive layer, and in any case the resistance of the lamination adhesive layer cannot be reduced too far or lateral conduction within the lamination adhesive layer will affect the image produced on the electro-optic display.

Attempts have been made to avoid the aforementioned problems by use of a radiation-cured adhesive, which is applied by a nip roll lamination process after the electro-optic layer has been coated and dried. However, this process still requires a secondary lamination and still leaves an adhesive layer between the electrodes in the final display, and thus involves the voltage drop problem already discussed.

Attempts have also been made to avoid the aforementioned problems by coating both the electro-optic layer and one electrode by coating over a conductive film using a variety of coating methods, including spray coating. However, it is very difficult to coat many electro-optic layer, such as encapsulated electrophoretic layers, using spray coating without leaving some gaps or "pinholes" in the coated electro-optic layer, and if an electrode layer is subsequently coated over an electro-optic containing pinholes, the coated electrode layer will short circuit with the conductive film, adversely affecting or destroying the electro-optic properties of the display. Also, the spraying of an electrode layer over a dried electro-optic layer inevitably involves rewetting the dried electro-optic layer with liquid, which may cause the liquid content of the electro-optic layer to vary, resulting in problems previously discussed.

It is known (see U.S. Pat. Nos. 7,110,164 and 9,470,950) to provide an encapsulated electrophoretic display layer with a binder which can also function as a lamination adhesive. This requires a binder which, when dried, will flow at a temperature of not more than about 150° C. This greatly restricts the range of binders which can be used, and may thus pose problems in finding a binder which is compatible with the other components of the electrophoretic layer. Furthermore, the process by which such a binder/adhesive is used to form an electro-optic display is very different from the processes of the present invention. An electrophoretic layer comprising such a binder/adhesive is coated in the normal way and dried. After drying and cooling, the electrophoretic display layer is then reheated, typically in hot laminator, in contact with a backplane, to form the final display. In contrast, as already noted, in the first process of the present invention, the electro-optic layer containing the binder is coated, and while this coated layer is still wet, the backplane is contacted therewith. Only after the backplane is in position is the electro-optic layer dried to secure the backplane to the electro-optic layer.

As already noted, the backplane of the present invention comprises at least one electrode disposed on a substrate which is porous to liquid. The liquid to which the backplane is porous should be the liquid which is present in the continuous phase of the electro-optic material or sealing material, and not the liquid which may be present in internal cavities or microcapsules within the electro-optic material. For example, the continuous phase make comprise a water-soluble polyurethane, whose viscosity (and conductivity) is a function of water content. Most electrophoretic materials use a hydrophobic, and typically hydrocarbon, liquid in the internal phase present within the internal cavities or microcapsules because such hydrophobic materials have high electrical resistance (thus reducing the power consumption of the display) and are not susceptible to electrolysis. The binders or continuous phases of such electrophoretic materials are typically aqueous and hence the backplane substrate should be porous to water. Any of a wide variety of hydrophilic polymers, including cellulose and similar polysaccharides may thus be used as the backplane polymer.

It is obviously desirable that as great a proportion as possible of the backplane be porous to the liquid since the presence of any non-porous areas is likely to lead to non-uniform drying of the electro-optic material, with consequent adverse effects on the uniformity of the electro-optic properties thereof. Thus, the presence of conventional metal electrodes on the backplane should in general be avoided. The preferred type of electrode comprises a large number of small particles of a conductive, hydrophilic particulate material, for example, a hydrophilic carbon black, with the electrodes being formed by a coating or printing process which leaves the electrode porous to the liquid. Nonetheless, transparent metal grid electrodes, such as etched high-transmission metal screens, percolated nanowire assemblies, and contact printed nanoparticle films can also be used as suitable porous electrodes in certain applications.

In some embodiments, a separate blooming layer will be used in conjunction with the transparent metal grid electrodes to produce more uniform switching of the electrophoretic media.

The front substrate used in the electro-optic display of the present invention may be of any of the types known in the prior art, as described for example in the patents and published applications mentioned above. Typically, the front substrate will comprise a thin, light-transmissive conductive layer (for example, a layer of indium tin oxide or a similar ceramic, often applied by sputtering; a conductive organic polymer, graphene or metallic microwires may be used in place of the ceramic) on a polymeric film, for example poly(ethylene terephthalate), although in some cases, as for example in displays intended to be written with a stylus or similar device, the conductive layer may be omitted. Coating of the electro-optic layer on to the front substrate may be effected in any of the ways known in the prior art. Also, any known sealing materials may be used in the displays of the present invention provided that the sealing material is compatible with the electrode and substrate materials used in the backplane.

The exposed surface of a layer of an encapsulated electrophoretic material coated on to a front substrate is frequently non-planar, since individual capsules tend to protrude above the surface of the binder, and in prior art electrophoretic displays the adhesive or other layer in contact with the electrophoretic material layer serves to planarize the surface of the electrophoretic material. The backplane used in the present process can effect such planarization, but care should be taken to ensure that the backplane is applied to the electrophoretic material layer with sufficient pressure to ensure that the electrophoretic material layer is planarized and all parts thereof are in contact with the backplane, since any voids between the two layers may adversely affect the electro-optic performance of the display.

In the processes of the present invention, the removal of the liquid from the electro-optic material or the sealing material is, in principle, effected in the same manner as in the prior art. However, it may be necessary to adjust the conditions used for the liquid removal somewhat (for example, by the use of a longer drying time and/or a higher drying temperature) to allow for the need for the liquid to diffuse through the backplane substrate. It is also, of course, necessary to ensure that the conditions used for the drying step are compatible with the materials used to form the electrode and substrate of the backplane so as to avoid, for example, oxidation of the electrode or substrate materials during the drying step. If necessary, the drying step may be carried out in an inert atmosphere to avoid such oxidation.

Preferred embodiment of the present invention will now be described, though by way of illustration only, with reference to the accompanying drawings.

FIG. 1 of the accompanying drawings, which is a schematic cross-section through a first step of a first process of the present invention, illustrates an encapsulated electrophoretic medium being deposited on a substrate 108 by means of a slot coating apparatus (generally designated 100) The apparatus 100 includes a coating die 102 through which a mixture of capsules 104 and a binder 106 is coated on a substrate 108, which is moving relative to the die 102 from right to left as illustrated in FIG. 1, as indicated by the arrow. As in the prior art processes, the substrate 108 comprises a polymeric film bearing on its upper surface (as illustrated in FIG. 1) a conductive layer, but for ease of illustration this conductive layer is not shown separately in FIG. 1. The capsules 104 and the binder 106 are deposited on to the conductive layer of the substrate 108 to form a substantially uniform, tacky layer on the substrate 108.

Figure 2:
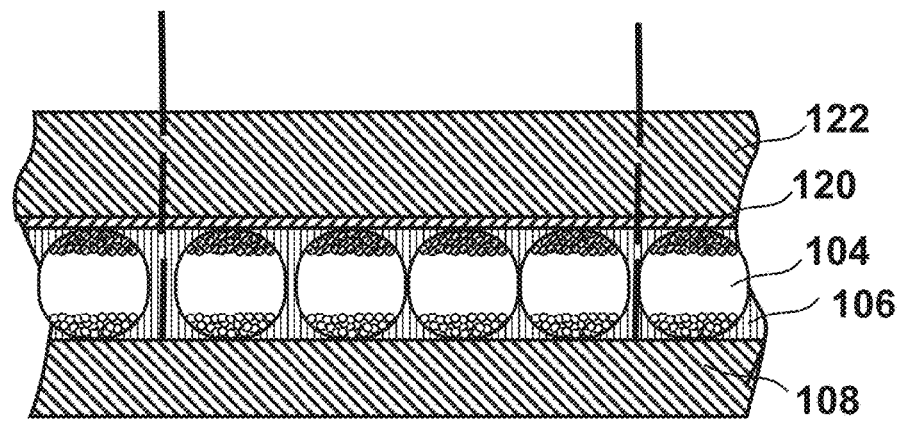
FIG. 2 is a schematic cross-section similar to that of FIG. 1 but showing a second step of the first process in which a backplane is contacted with the exposed surface of the electro-optic layer.

FIG. 2 illustrates the application of a porous backplane to the coated substrate produced in FIG. 2. As may be seen in FIG. 2, the porous backplane comprises a continuous porous electrode 120 (a number of discrete electrodes may alternatively be provided), preferably formed from hydrophilic carbon black and a porous substrate 122, preferably formed of cellulose. Alternatively, the porous electrode can be formed from a conductive hydrophilic polymer, such as polypyrrole, that is pre-patterned to have openings. Alternatively, the conductive hydrophilic polymer may be a doped polymer, such as poly(ethylene)glycol doped with conductive materials, such as carbon black, graphite, or conductive nanowires/nanotubes. Alternatively, the porous substrate can be fiberglass, or another inert spun material. The porous backplane 120, 122 is laminated under pressure to the exposed surface of the binder/capsules layer 104, 106. As shown in FIG. 2, each capsule 104 includes charged electrophoretic particles that move in the presence of an electric field. The techniques for forming capsules of charged electrophoretic media are described in the patents listed above. The charged electrophoretic particles may have different colors depending upon the magnitude and the polarity of their charge. The combined assembly is then heated to about 60° C. for a period sufficient for a substantial proportion of the water present in binder 106 to diffuse through the backplane 120, 122 and evaporate from the exposed surface thereof, thereby drying the binder 106 and adhering backplane securely to the binder/capsules layer and the front substrate to form a finished display of the invention.

In an alternative construction (i.e. a front-plane laminate), the substrate 108 may be a release sheet coated with a layer of adhesive. In this construction, the resulting assembly includes a continuous porous electrode 120, a porous substrate 122, and a mixture of capsules 104 and a binder 106 coated on a substrate 108 (i.e., a release sheet). In this embodiment, it may be preferable that both the continuous porous electrode 120 and the porous substrate 122 are light transmissive. For example, the continuous porous electrode 120 and the porous substrate 122 may be indium tin oxide (ITO) coated polyethylene terephthalate (PET) including micron-sized holes that are drilled with a laser (i.e., direct-write laser patterning). Alternatively, the patterned PET-ITO can be achieved with wet etching and photolithography. Accordingly, the porous substrate 122 and porous electrode 120 make up a front-electrode, and the resulting front plane laminate to be coupled to an active matrix electrode backplane using the techniques described in the preceding patents.

The display shown in FIG. 2 thus formed comprises only a single pixel because the porous electrode 120 is continuous over the whole display. However, the substrate 122 and the electrode 120 may afterwards be diced (severed or cut) into several pieces, as indicated by the heavy broken lines in FIG. 2, to form a multi-pixel display. The dicing may be effected by laser kiss cutting or other appropriate techniques. Connectors may then be provided to the several discrete electrodes thus formed, for example in the manner described in U.S. Pat. No. 6,232,950. The resulting display will have various segmented electrodes that can be independently controlled to provide, e.g., a design, letters, numbers, or characters on the view side of the display.

Figure 3:
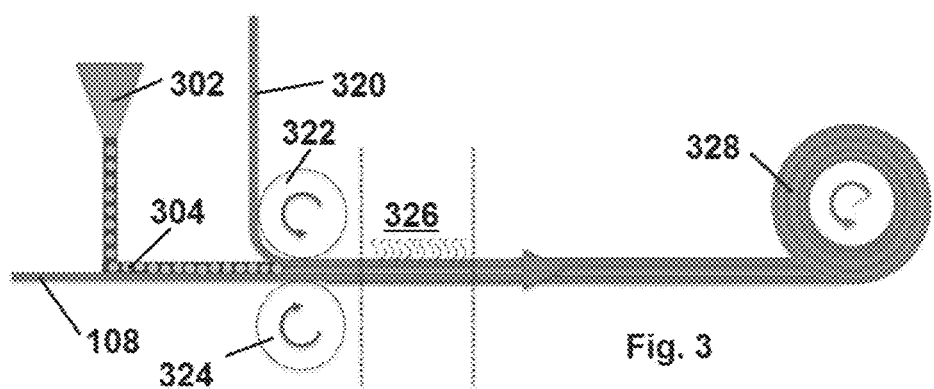
FIG. 3 is a schematic cross-section showing how the process of FIGS. 1 and 2 can be carried out on a roll-to-roll basis.

It will readily be apparent to those skilled in the manufacture of electro-optic displays that the processes described above with reference to FIGS. 1 and 2 can readily be combined into a continuous, roll-to-roll operation, and such an operation is schematically illustrated in FIG. 3. As shown in FIG. 3, a web of front substrate 108 (e.g., including a light-transmissive front electrode and a substrate) taken from a roll (not shown) is passed below a coating station 302, which deposits a capsule/binder coating 304 on to the substrate 108. While still wet, the coating 304 is contacted with a continuous web of porous backplane 320 and then immediately passed through a nip between two rollers 322, 324 to secure the porous backplane 320 to the coating 304. The substrate/coating/backplane assembly thus produced is passed through a drying zone 326 and wound up on a roll 328. Obviously, if desired additional operations (for example, laser cutting to form discrete electrodes from the backplane electrode, and provision of conductors to the discrete electrodes thus produced), can be effected between drying zone 326 and roll 328. Alternatively, the continuous web of displays emerging from the drying zone 326 may be severed by appropriate cutting devices (not shown) to form discrete displays, and the roll 328 replaced by a suitable stacking device for the discrete displays.

FIG. 4 illustrates schematically the filling of microcells with an electrophoretic internal phase. For background information on the formation, filling and sealing of microcells, the reader is referred to U.S. Pat. Nos. 7,715,088 and 9,346,987. In FIG. 4, a microcell substrate 402, in which are formed a plurality of cavities 404, is moved from left to right as illustrated, as indicated by the arrow. Internal phase from a reservoir 406 flows downwardly and forms a bead 408 on the surface of the substrate 402. Excess internal phase is removed by a doctor blade 410 to leave the cavities 404 filled exactly level with the top of the walls that divide these cavities.

The filled substrate produced in FIG. 4 is then fed to a sealing station illustrated in FIG. 5, where again the substrate is moved from left to right as illustrated as indicated by the arrow. Flowable sealing material from a reservoir 412 forms a bead 414 on the surface of the filled substrate.

Instead of removing excess sealing material with a doctor blade, as in the aforementioned U.S. Pat. No. 7,715,088, the filled substrate coated with the sealing material is immediately contacted with a porous backplane 416, and the web of filled substrate, sealing material and backplane is passed beneath a roller 418, which serves to control the thickness of the layer of sealing material. The web can then be passed through a drying station as described above with reference to FIG. 3 and then rolled up in web form or severed to form individual displays as previously described.

From the foregoing, it will be seen that the present invention can provide an electro-optic display in which no adhesive need be present between the electrodes, thus enabling the entire potential difference between the electrodes to be used for driving the electro-optic medium. The present invention also eliminates or reduces the need for slow lamination steps during the manufacture of electro-optic displays.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic display comprising:
a light transmissive front electrode;
a layer of electro-optic material disposed adjacent the light transmissive front electrode, the electro-optic material including a continuous phase comprising a polymeric material and a liquid; and
a backplane disposed adjacent the layer of electro-optic material and opposite to the light transmissive front electrode, the backplane comprising an electrode and a substrate, wherein the electrode is in contact with the layer of electro-optic material and the substrate is porous to the liquid.

2. The electro-optic display of claim 1, wherein the electro-optic material comprises electrically-charged particles disposed in a fluid and capable of moving through the fluid under the influence of an electric field.

3. The electro-optic display of claim 2, wherein the electrically charged particles and the fluid are confined within a plurality of capsules dispersed in the continuous phase.

4. The electro-optic display of claim 2, wherein the electrically charged particles and the fluid may be present as a plurality of discrete droplets surrounded by the continuous phase, without an intervening capsule wall.

5. The electro-optic display of claim 1, further comprising a front substrate arranged to support the light transmissive front electrode.

6. The electro-optic display of claim 1, wherein the substrate comprises a porous hydrophilic polymer.

7. The electro-optic display of claim 1, wherein the backplane electrode comprises carbon black.

8. The electro-optic display of claim 7, wherein the backplane electrode is coated or screen printed on to the substrate.

* * * * *